(12) United States Patent
Gardiner et al.

(10) Patent No.: US 6,968,464 B2
(45) Date of Patent: Nov. 22, 2005

(54) SYSTEM AND METHOD FOR RECONFIGURING A SYSTEM COUPLED TO A HOST COMPUTER THROUGH A SPLIT BRIDGE

(75) Inventors: Eric R. Gardiner, Austin, TX (US); Craig M. Conway, Leander, TX (US); Christopher A. Clark, Austin, TX (US); Scott B. Kovner, Cedar Park, TX (US); William Pitts, Coupland, TX (US)

(73) Assignee: National Instruments Corporation, Austin, TX (US)

( * ) Notice: Subject to any disclaimer, the term of this patent is extended or adjusted under 35 U.S.C. 154(b) by 744 days.

(21) Appl. No.: 10/043,402

(22) Filed: Jan. 10, 2002

(65) Prior Publication Data

US 2003/0131227 A1    Jul. 10, 2003

(51) Int. Cl.[7] .................................................. G06F 1/26
(52) U.S. Cl. ...................................... 713/300; 710/305
(58) Field of Search ................................ 710/305, 303, 710/241, 300, 100, 306; 713/300, 1

(56) References Cited

U.S. PATENT DOCUMENTS

| | | | |
|---|---|---|---|
| 6,070,214 A | 5/2000 | Ahern | |
| 6,418,492 B1 * | 7/2002 | Papa et al. ................... | 710/302 |
| 6,418,504 B2 | 7/2002 | Conway et al. | |
| 6,425,037 B1 | 7/2002 | Kondo et al. | |
| 6,567,876 B1 | 5/2003 | Stufflebeam | |
| 6,687,779 B1 * | 2/2004 | Sturm et al. ................ | 710/305 |

* cited by examiner

*Primary Examiner*—Thomas Lee
*Assistant Examiner*—Mark Connolly
(74) *Attorney, Agent, or Firm*—Meyertons Hood Kivlin Kowert & Goetzel, P.C.; Jeffrey C. Hood; Mark S. Williams

(57) ABSTRACT

System and method for configuring a second system in a split bridge distributed environment. A host computer system (host) includes a memory operable to store host driver software (drivers) and a CPU operable to execute the drivers. A serial bus couples the host to the second system. The host saves configuration information for the second system. The second system receives user input requesting a power down condition. The drivers enters a quiescent state, generating an indication of a power down condition. The user powers down and reconfigures the second system. The host detects a link down condition between the host and the second system, and monitors a link status between the host and second system. The user powers up the second system. The host detects a link up condition, restores second system configuration, and performs a discovery process on the second system.

68 Claims, 7 Drawing Sheets

SYSTEM AND METHOD FOR RECONFIGURING A SYSTEM COUPLED TO A HOST COMPUTER THROUGH A SPLIT BRIDGE

FIELD OF THE INVENTION

The present invention relates to the field of computer architecture, and more particularly to a system and method for reconfiguring a system in a distributed environment.

DESCRIPTION OF THE RELATED ART

Computer systems and other electronic devices generally include or use buses for the transfer of data between various sub-systems. Exemplary buses, include PCI, VME, ISA, EISA, etc.

For example, the Peripheral Component Interconnect (PCI) Local Bus is a high performance, 32-bit or 64-bit bus with multiplexed address and data lines. It is intended for use as an interconnect mechanism between highly integrated peripheral controller components, peripheral add-in boards, and processor/memory systems. The PCI bus has emerged as a very popular expansion bus for many computer systems and embedded systems. A plethora of chipsets, devices, and controllers with a PCI bus interface are currently available. Examples of I/O functions performed by PCI products include high-speed graphics controllers, Small Computer System Interface (SCSI) controllers, Fiber Channel adapters, Serial Storage Architecture (SSA) adapters, and local area network (LAN) interface devices such as Ethernet, Token Ring and FDDI controllers.

Another popular I/O function where computer buses are used is in the area of instrumentation. An instrument is a device which collects data or information from an environment or unit under test and displays this information to a user. An instrument may also perform various data analysis and data processing on acquired data prior to displaying the data to the user. Examples of various types of instruments include data acquisition devices, oscilloscopes, digital multimeters, signal analyzers, etc. The types of information which might be collected by respective instruments include voltage, resistance, distance, velocity, pressure, frequency of oscillation, humidity, temperature, image data, and audio data, among others.

Modern instrumentation systems are moving from dedicated stand-alone hardware instruments such as oscilloscopes, digital multimeters, etc., to a concept referred to as virtual instrumentation. Virtual instrumentation systems comprise instrumentation hardware such as circuit boards which plug into general purpose personal computers. The instrumentation hardware is controlled by software which executes on the computers. Many virtual instrument hardware devices have been developed which plug into a PCI bus, or into other buses that use PCI signaling protocols, such as Compact PCI (CPCI) or PCI extensions for Instrumentation (PXI). Other popular instrumentation buses are the VXI (VMEbus eXtensions for Instrumentation) bus and General Purpose Interface Bus (GPIB).

In many applications, often there is a need for the I/O function to be physically located remotely from the host computer. For example, in a measurement application, a data acquisition (DAQ) device may be required to be located in a test chamber which is separated by some distance from the host computer controlling it. As another example, one or more measurement devices may be installed in a chassis that is connected to a computer system. For another example, a notebook computer may use a docking station to couple to other devices which are typically located at the user's desk, where the docking station provides additional PCI expansion capability to the notebook computer. In other words, in many applications it is desirable that the corresponding system be implemented as a distributed system. Note that as used herein, the term "remote" may refer to separation distances between the host system and the remote device of anywhere from a few centimeters to hundreds or even thousands of meters. In other words, the term "remote" denotes that the remote device is coupled to, but distinct from, the host system.

One solution for remotely interfacing devices to a computer is the use of a "split bridge," U.S. Pat. No. 6,425,033 titled System and Method for Connecting Peripheral Buses Through a Serial Bus (Ser. No. 09/092,342) and U.S. Pat. No. 6,418,504 titled System and Method for Connecting Peripheral Buses Through a Serial Bus (Ser. No. 09/876, 003) both assigned to National Instruments Corporation describe a "split bridge" implementation. U.S. Pat. No. 6,070,214 assigned to Mobility Electronics also describes a "split bridge" implementation. A split bridge may allow the extension of a computer bus, such as a PCI bus, to a remote location with little or no performance degradation or software requirements. For example, standard PCI—PCI bridge chip functionality may be split between two remotely located components which may be located on the computer and the remote chassis, respectively. For example, in a PCI split bridge system, the host computer includes a primary PCI bus and a first interface comprising a first portion of the bridge, the remote system includes a secondary PCI bus and a second interface comprising a second portion of the bridge, and the two systems are coupled via a transmission medium, e.g., a serial or parallel transmission cable. The first interface, the transmission medium, and the second interface may collectively comprise the bridge. In this manner, PCI devices attached to both of the PCI systems may be coupled seamlessly, or transparently, i.e., the PCI expansion devices coupled to the remote PCI bus may appear to the computer system as if they were coupled directly to the local PCI bus in the host computer system. One added benefit of this approach is the expansion of the number of PCI devices which may be included in the overall system, normally limited to 3 or 4 PCI devices. Of course, this technique is not limited to PCI based systems, and may be used with other buses as well, such as Compact PCI, PXI, VME or VXI, among others.

Many protocols used for communication in distributed systems, for example, the PCI based protocols mentioned above, do not support "hot plugging" of components. In other words, expansion cards may not be reconfigured without rebooting the host system. Additionally, a problem with a split bridge implementation is that when the user reconfigures the remote system, the original configuration of the remote system is lost, and so the host system has no way of knowing that the configuration has changed. For example, in prior art systems, when the user changes the remote system configuration, for example, by changing out a card, removing a card, etc., the remote system is powered down, the old card is removed and replaced with the new card, and the reconfigured remote system is powered back up. If the host system is not rebooted, the host system remains unaware of the card change, and so may subsequently attempt to communicate with the old card, possibly resulting in an error condition, unexpected behavior, or non-functionality. Therefore, in distributed systems which do not support hot-plugging of remote devices, after reconfiguration of the remote system, the host computer system must be rebooted to initiate a discovery process.

The reboot of the host computer system may be not only inconvenient, but may be expensive in that the time required for reboot could have been spent performing some other task. For example, in a manufacturing test application where many PCI circuit cards are successively inserted into a remote test chassis, tested, and removed, having to reboot the host computer each time a card is inserted or removed in the remote system may take substantially longer than the actual test procedure. In another example, when the remote system is located far away from the host computer system and a single user manages both, the user may have to walk back and forth between the two, e.g., to debug the system, spending a substantial amount of time in transit.

Therefore, improved systems and methods are desired for reconfiguring a remote system in a split bridge distributed environment.

SUMMARY OF THE INVENTION

A system and method are described which provide for reconfiguration of a second or remote system in a distributed environment. The system may comprise a first system, also referred to as a host computer system, which includes a first bus, and the second system, which includes a second bus. Note that as used herein, the term "remote" may refer to separation distances between the first or host system and the second or remote system of anywhere from a few centimeters to hundreds or even thousands of meters. In other words, the term "remote" denotes that the remote system or device is coupled to, but distinct from, the host system. The second system may include one or more devices coupled to the second bus. The first bus of the host computer system may be coupled to the second bus of the remote system through a split bridge. The split bridge may include two portions: a first portion, or first interface, in the host computer system which couples to the first bus, and a second portion, or second interface, in the second system. The first interface and the second interface are coupled through a communication medium, such as serial bus. The first interface, the second interface and the communication medium collectively comprise a bus bridge between the first bus and the second bus.

In one embodiment, the first bus does not support hot plug capabilities. In one embodiment of the invention, the split bridge implementation provides that any configuration changes made to the second system (i.e., to devices or expansion cards in the second system) may automatically be made known to the host computer system, enabling reconfiguration of the second system to be made without powering down the host computer system. The first interface of the split bridge is coupled to the non-hot-plug first bus to provide power cycling features and functionality to the second system. The second bus of the second system may couple the devices to the second interface. In one embodiment, the second system may include a chassis with slots for receiving expansion cards (i.e., the devices).

In one embodiment, one of the devices coupled to the second bus may comprise a non-transparent bridge. An expansion bus also comprised on the second system may couple to the non-transparent bridge. Additionally, one or more other devices (including, for example, an additional chassis) may couple to the expansion bus. Thus, the second system may include an expansion bus with one or more devices coupled to the second bus through a non-transparent bridge, described in more detail below.

One embodiment of a reconfiguration process for the split bridge distributed system is described below. In this embodiment, the second system is a remote system located remotely from the host computer system, although it is noted that in other embodiments, the second system may be located proximate to the host computer system (the first system), and the methods described still apply.

In the "Start" state, the system is assumed to be idle. The host device drivers executing on the host computer system may save (the contents of) configuration registers for devices on the second, or remote, bus. The configuration registers may be saved after device drivers are loaded, for example, during the back end of the operating system (OS) boot process. Thus, after the device drivers are loaded, each device driver may save its respective device's (expansion module's or card's) configuration registers. After the device drivers are loaded, applications can communicate with the remote system (devices in the (remote) chassis).

The split bridge interface is preferably idle prior to the user request to reconfigure the remote system, i.e., there can be no PCI traffic across the split bridge interface during the request.

The user may request to bring the bridge interface "offline", i.e., to communicatively decouple the remote system from the host computer system. This request is generally made when the user is interested in reconfiguring devices in the remote chassis without rebooting the host computer. Said another way, the user may request a power down condition. In one embodiment, the user may bring the system offline using a hardware mechanism on the secondary interface (e.g., a switch, button, etc., on the remote system). If a hardware mechanism is used to request that the bridge interface be taken offline, then the bridge may assert a hardware interrupt to notify the host of the offline request, i.e., the bridge may generate an indication of the power down condition to the host computer. The request to take the bridge interface offline may also take the form of the user adding or removing a card from the remote system.

In another embodiment, the user may request to take the system offline, i.e., may request a power down condition, using software running on the host computer system. If the software notification mechanism is used, the software may perform a function similar to the hardware interrupt, e.g., via a software interrupt or a message, asserting that the user has requested that the system be taken offline. In other words, the software may generate an indication of the power down condition to the host computer.

In response to the interrupt or notification, i.e., the indication of the power down condition, the device drivers for the devices may enter a quiescent state. In one embodiment, this state may result from the following process: the split bridge device driver may detect the user's request, i.e., a "request offline" condition may be detected. The split bridge device driver may then notify other device drivers of the condition. For example, the split bridge device driver may trigger an "offline event" for each of the other device drivers. In this manner, the offline event may be passed to all device drivers for the expansion cards. When each device driver receives this event, the driver may disable the expansion card's ability to assert an interrupt and perform any additional operations necessary for placing the device driver into a quiescent state. Disabling interrupts may prevent a shared PCI interrupt from attempting to access a register on a remote device (expansion card) once the link is down. In other words, in a quiescent state, the driver preferably disallows register access to the expansion card.

Once device drivers have entered a quiescent state, the secondary interface may indicate the offline condition (i.e., the power down ready indicator) using an "Online/Offline" LED or some other visual indicator. In one embodiment, the host may indicate that the bridge interface is offline using an application, e.g., via a graphical user interface (GUI) program which is operable to display the status of the bridge interface.

Once the bridge interface is offline, the device drivers may remain idle until the remote chassis is brought back online. During this time, the bridge device driver may keep track of the link status. In one embodiment, the bridge device driver may track the link status by polling a status register. In another embodiment, the bridge device driver may listen for a link status interrupt.

When the user powers down the remote chassis, the link between the primary and secondary interfaces is lost. At this point the bridge device driver may detect that the link is lost, and the other device drivers may continue to disallow access to their respective expansion cards.

While power to the remote system is off, the user may reconfigure the devices (expansion cards) in the remote chassis. When the user has finished reconfiguring the remote chassis, i.e., one or more of the devices or expansion cards comprised in the remote chassis, power may be restored to the remote system. In one embodiment, a button or switch on the remote system may be provided for power-cycling.

Then, after power is restored to the remote system, the bridge interface may automatically reestablish the link between the primary and secondary interfaces, thus reestablishing communications between the host computer system and the remote system. In one embodiment, after the link has been reestablished, the bridge device driver may be notified of the link being restored by polling a link status register or by listening for a link status interrupt.

The device drivers of devices or cards on the remote bus (including any non-transparent bridge or transparent bridge) may be notified that the link is reestablished and restore the state of their respective devices or expansion cards (including any bridges or interfaces). In a preferred embodiment, the PCI configuration registers (which were saved above) are restored first so that communication with the remote system is possible, then device-specific registers are restored, enabling communication with the specific devices on the remote bus.

After the link is reestablished, the secondary bridge (the portion of the split bridge comprised in the remote system) may indicate that the bridge is online by illuminating an "Online" LED (or by restoring the state of whatever visual indicator was used above). In other words, the remote system may indicate that the host device driver software (e.g., the driver software for the remote bus devices) is no longer in a quiescent state.

Finally, the host system may discover any devices or expansion cards behind the non-transparent bridge or interface. In other words, the host system may perform a discovery process for the devices or expansion cards on the remote expansion bus. In one embodiment, the discovery process may include detection of the devices, querying the devices for resource requirements, and assigning the required resources to the devices.

If the bridge device driver determines that the link is not down, then the bridge device driver may determine whether the user has requested an online condition. If the bridge device driver determines that the user has not requested an online condition, then the bridge device driver may continue to monitor the link status.

If the bridge device driver determines that the user has requested an online condition, then the secondary interface may indicate that the bridge is online, e.g., by illuminating an "Online" LED, as described above, followed by the discovery process described above.

In one embodiment, there may be restrictions regarding the allowed reconfiguration operations for devices coupled to the second bus (without an intervening non-transparent bridge), such as:

1. When the host computer is rebooted, any expansion card that the user wishes to operate at any time, present or future (including remote chassis reconfiguration), must be present. This restriction has the following ramifications:

2. New expansion cards cannot be added to the system without rebooting the host computer. For example, if the host computer is booted, and four expansion cards are present, then the remote chassis cannot be reconfigured with five or more devices without a full reboot.

3. Expansion cards should only be replaced with cards of the same "type". Cards with the same type will request resources identical to the card they replace. For example, if card A requests 1 k of PCI memory space and one interrupt level, then it should only be replaced with card B if card B also requests 1 k of PCI memory space and one interrupt level. Additionally, card B should request the 1 k of space in an identical manner to card A, i.e. it should implement the same base address registers (and corresponding sizes) as card A.

Thus, in this embodiment of the invention, the reconfiguration (without host reboot) of the devices, i.e., the remote bus devices, may be restricted to a restoration of configuration information after power-cycling the remote system. One application of this embodiment relates to manufacturing testing, where substantially identical expansion cards are successively inserted into the remote chassis, tested, then replaced with the next card to be tested. As mentioned above, in prior art systems which do not support hot plugging of the expansion cards, replacing a device (card) generally requires rebooting the host computer system.

In another embodiment, a bridge may be coupled to the second or remote bus. One or more devices may be coupled to the bridge, optionally including an additional chassis. In one embodiment, the bridge is a transparent bridge where the additional chassis (and any associated expansion cards) appears to the host computer as though it is directly plugged into its expansion (PCI) bus. In this embodiment, the devices coupled to the transparent bridge are constrained by the restrictions listed above. Thus, the additional chassis, and any expansion cards contained therein, may only be replaced with (substantially) identical components, after which the system may restore their respective configurations. In one embodiment, the additional chassis may be substantially the same as the remote chassis. It should be noted that the bridge itself may be considered simply another restorable device coupled to the remote bus, and thus, is subject to the restrictions mentioned above.

In another embodiment, the bridge may comprise a non-transparent bridge, in which the address space of the additional chassis is distinct from that of the host and remote bus. In this case, any expansion cards comprised in the additional chassis may be reconfigured as desired without the necessity of powering down the host computer system. In other words, the restrictions noted above may not apply to the devices downstream from the non-transparent bridge.

As mentioned above, a remote expansion bus may couple to the non-transparent bridge, and one or more other devices (including an additional chassis) may couple to the remote expansion bus. The fact that the bridge is non-transparent allows the cards to be reconfigured, added, removed, and/or replaced without host reboot. The reconfiguration operations allowed may be restricted, depending on the device or expansion card. As noted above, any devices or expansion cards on the remote bus are restricted to power-cycling or replacement with a card or device of the same type. In contrast, the cards on the remote expansion bus may be reconfigured as desired, including adding, removing, swapping, or any other reconfiguration.

It is noted that in other embodiments, additional bridges and chassis may be daisy-chained off of the additional chassis in like manner, where the transparent/non-transparent nature of the bridges determines the scope of or restrictions on the reconfigurability of the additional devices. For example, where a series of chassis are daisy-chained via bridges, and one of the bridges is non-transparent, full reconfigurability of any chassis and expansion cards downstream from the non-transparent bridge is supported, while those upstream may be restricted as noted above.

In one embodiment, the computer system may include a first bus (e.g., a first PCI bus) and a first interface (e.g., a primary interface) coupled to the first bus, where the first interface includes first bus interface circuitry (e.g., PCI interface circuitry) for interfacing to the first bus. A remote device, which may be located remotely from the computer system, may include a second bus (e.g., a second PCI bus), one or more devices, e.g., peripheral devices, coupled to the second bus, and a second interface (e.g., a secondary interface) coupled to the second bus, where the second interface includes second bus interface circuitry (e.g., PCI interface circuitry) for interfacing to the second bus. A serial bus may couple the first interface and the second interface.

The first interface and the second interface may operate as a single bridge (e.g., a PCI—PCI bridge). In other words, the first interface may operate as a first portion of the bridge, and the second interface may operate as a second portion of the bridge. For example, the first interface and the second interface may collectively implement a single bridge register set of the single (PCI—PCI) bridge.

A first device (e.g., a first peripheral device) may then be operable to be coupled to the second bus of the remote device and may be operable to interoperate with the computer system without requiring rebooting of the computer system. In other words, the first device may be added to the remote device, and may function (in conjunction with the computer system) without the need to reboot the computer system.

In one embodiment, the first device coupled to the second bus of the remote device may be operable to be replaced with a second device coupled to the second bus of the remote device. The second device may then be operable to interoperate with the computer system without requiring rebooting of the computer system. In one embodiment, the second device may be the same type as the first device, as described above.

Thus, the system and method provide for reconfiguration of a system in a split bridge distributed environment without necessitating a reboot of the host computer system.

BRIEF DESCRIPTION OF THE DRAWINGS

A better understanding of the present invention can be obtained when the following detailed description of the preferred embodiment is considered in conjunction with the following drawings, in which.

Figure 1:
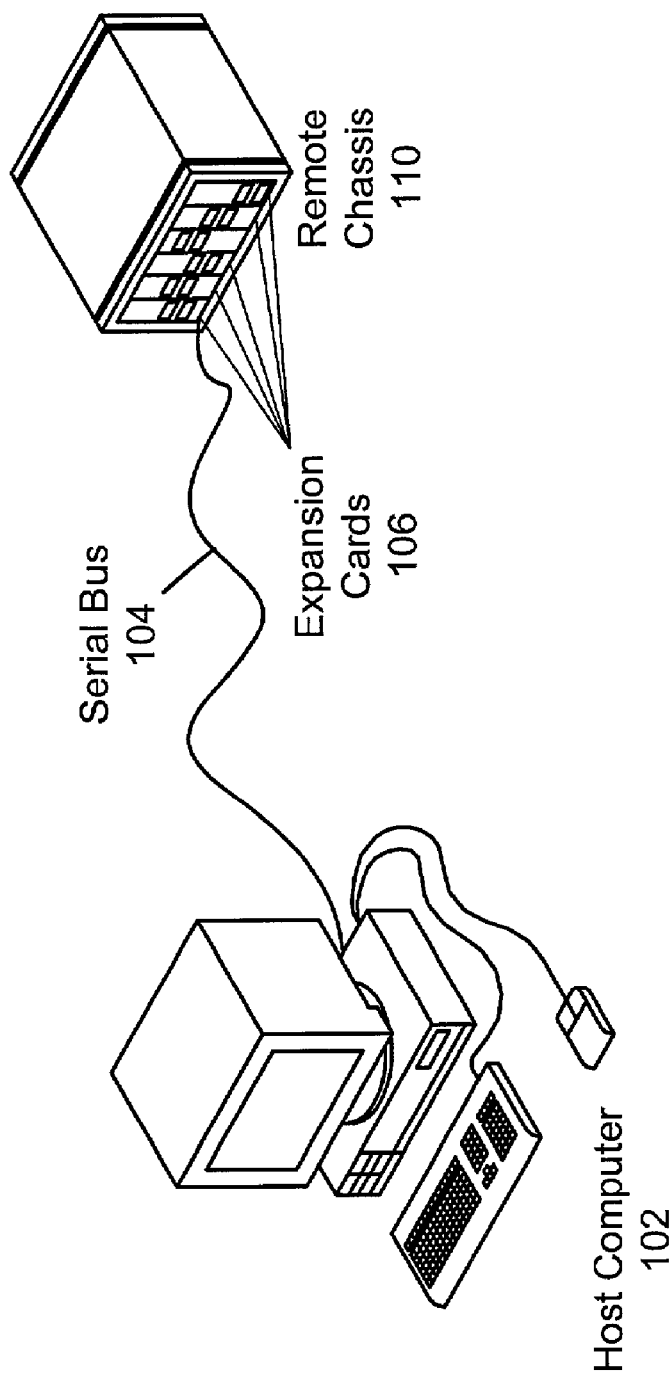
FIG. 1 illustrates a distributed system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

U.S. patent application Ser. No. 09/092,342 entitled "Wide Area Serial PCI System And Method For Connecting Multiple PCI Buses", whose inventors are Craig M. Conway, Kevin L. Schultz, B. Keith Odom, Glen O. Sescila, Bob Mitchell, Ross Sabolcik, and Robert Hormuth, and which was filed on Jun. 5, 1998, is hereby incorporated by reference in its entirety as though completely and fully set forth herein.

U.S. Pat. No. 6,070,214 entitled "Serially Linked Bus Bridge For Expanding Access Over A First Bus To A Second Bus", whose inventor is Frank Ahern, and which issued on May 30, 2000, is hereby incorporated by reference in its entirety as though completely and fully set forth herein.

U.S. Pat. No. 6,088,752 entitled "Method And Apparatus For Exchanging Information Between Buses In A Portable Computer And Docking Station Through A Bridge Employing A Serial Link", whose inventor is Frank Ahem, and which issued on Jul. 11, 2000, is hereby incorporated by reference in its entirety as though completely and fully set forth herein.

U.S. Pat. No. 6,093,039 entitled "Docking Device For A Portable Computer", whose inventor is Charles Lord, and which issued on Jul. 25, 2000, is hereby incorporated by reference in its entirety as though completely and fully set forth herein.

U.S. Pat. No. 5,764,924 entitled "Method and Apparatus for Extending a Local PCI Bus to a Remote I/O Backplane", whose inventor is Soon Chul Hong, and which issued on Jun. 9, 1998, is hereby incorporated by reference in its entirety as though completely and fully set forth herein.

FIG. 1: A Distributed System

As used herein, the term "host computer" refers to a computer system (the first system) which is coupled to one or more instruments or devices (e.g., expansion cards) and which operates as a system controller. The host computer may include a serial bus primary interface, and may also execute device drivers for one or more expansion cards comprised in the system. It is noted that in the preferred embodiment, the communication protocol used for communication between the host computer and the second, or remote, system, i.e., the primary interface protocol, is one which does not inherently support hot-plugging.

As used herein, the term "remote system" refers to the second system, and may refer to a expansion chassis located remotely from the host computer which preferably includes a serial bus secondary interface, and any devices or expansion cards coupled to or comprised in the remote chassis. In other words, the expansion cards are preferably modules comprised in the remote chassis.

The device drivers for these modules may run or execute on the host computer, as mentioned above. The device drivers comprise system software for the expansion cards in the remote chassis, and thus may provide an interface for applications to communicate with expansion cards.

Note that as used herein, the term "remote" may refer to separation distances between the host system and the remote system or device of anywhere from a few centimeters to hundreds or even thousands of meters. In other words, the term "remote" denotes that the remote system or device is coupled to, but distinct from, the host system. In one embodiment, the remote system may be located more than about 2 meters from the host computer system. In other embodiments, the remote system may be located tens, hundreds, or even thousands of meters from the host computer system. Thus, although in many of the embodiments described herein, the second system is a remote system located remotely from the host computer system, it is noted that in other embodiments, the second system may be proximate to the host computer system.

As used herein, the term "bridge device driver" refers to system software for managing a split bridge interface between the host computer and the remote system (i.e., the devices comprised in the remote system). The bridge device driver is responsible for detecting offline requests, link status, etc., for the host computer.

As used herein, the term "configuration registers" refers to an expansion card's common PCI configuration registers, as wells as any device-specific register that needs to be restored after a power cycle, i.e. after the system has been powered down and back up again.

As used herein, the term "primary interface" refers to the half of the split bridge that resides in the host computer. The primary interface contains its own copy of configuration registers, including registers to indicate the link status of the serial bus. As used herein the term "secondary interface" refers to the subordinate half of the split bridge which is located in the remote chassis.

As used herein, the term "non-transparent bridge" refers to a bridge that isolates a primary address map from a secondary address map using address translation between the buses, thereby creating two independently configured address domains. This isolation provides the necessary disjunction between the primary and secondary interfaces of the split bridge, making the split-bridge non-transparent.

As used herein, the term "serial bus" refers to the interconnect between the split bridge primary interface (in the host computer) and the split bridge secondary interface (in the remote chassis).

FIG. 1 illustrates a distributed system, according to one embodiment. As shown, the system includes a host computer system 102, i.e., the first system, connected through a serial bus 104 to a second system or chassis 110, e.g., a remote system which is located remotely from the host computer system 102. The remote chassis 110 may include various expansion cards 106, such as instrumentation cards or other peripheral or component cards. The serial bus 104 may range from several meters to several kilometers or more in length. The serial bus 104 may be any of various types of physical connections, such as copper wire, coaxial cable, or fiber optic cable, among others. The serial bus 104 may also implement various types of protocols, such as Compact PCI, Small PCI, PCI-X, VXI, or PXI, among others. Although the PCI bus is used in the following descriptions of the present invention, this is not intended to limit the invention to any particular bus, i.e., any other bus may be used to implement various embodiments of the invention, including wireless or any other transmission means. Similarly, it is noted that although distributed instrumentation is an exemplary application of the present invention, the systems and method described herein are broadly applicable to any applications using a split bridge interface between a host computer system and a second system.

In one embodiment, the host computer system 102 may include a local or first (primary) bus, such as a Peripheral Component Interconnect (PCI) bus. Various devices may be connected to the PCI bus, such as a video or graphics card, a hard drive, instrumentation devices, or any other compatible peripheral device or card. Similarly, the remote chassis 110 may comprise a remote or second (secondary) PCI bus and one or more peripheral devices or cards 106 coupled to the second PCI bus. Thus, the host computer 102 and the remote chassis 110 may comprise two PCI bus systems located remotely from each other.

The host computer 102 may include a CPU and memory media, such as Random Access Memory (RAM), a hard drive, an optical drive, etc. The host computer 102 may further include host driver software for communication with the remote system 110.

In one embodiment, the computer may also include chipset logic which implements a primary PCI bridge or bus controller which couples to the local or primary PCI bus, and thus may include PCI interface circuitry for interfacing to the primary PCI bus. In one embodiment, the primary bridge may comprise a complete PCI bridge. In the preferred embodiment, the primary bridge comprises a first portion, e.g., half, of a PCI—PCI split bridge, described below with reference to FIG. 3.

The remote chassis 110 may include a secondary bridge coupled to the secondary PCI bus, which may include PCI interface circuitry for interfacing to the secondary PCI bus. As before, in one embodiment, the secondary bridge may comprise a complete PCI bridge. In the preferred embodiment, the secondary bridge comprises a second portion, e.g., the other half, of a PCI—PCI split bridge, described below with reference to FIG. 3. The serial bus 104 may be coupled between the primary bridge and the secondary bridge, and so may facilitate communication between the local and remote PCI systems.

Each of the primary bridge and secondary bridge may include parallel/serial transceivers for converting parallel data generated on the primary PCI bus and secondary PCI bus, respectively, to serial data for transmission on the serial bus 104 and for converting serial data received from the serial bus 104 to parallel data for generation on the primary PCI bus and secondary PCI bus, respectively. The primary bridge and the secondary bridge may collectively implement a PCI—PCI bridge register set.

The primary bridge and secondary bridge may be operable to transmit PCI bus cycles over the serial bus 104. The primary bridge may be operable to receive PCI cycles on the primary PCI bus and generate serial data on the serial bus 104 in response thereto, and the secondary bridge may be operable to receive the serial data from the serial bus 104 and generate corresponding PCI cycles on the secondary PCI bus. In a similar manner the secondary bridge may be operable to receive PCI cycles on the secondary PCI bus and generate serial data on the serial bus 104 in response thereto, and the primary bridge may be operable to receive the serial data from the serial bus 104 and generate corresponding PCI cycles on the primary PCI bus. In this manner, the CPU in the host computer system 102 may be operable to generate cycles on the primary PCI bus to communicate with peripheral devices coupled to the secondary PCI bus. Likewise, the peripheral devices in the remote system 110 coupled to the secondary or remote PCI bus may generate cycles on the secondary PCI bus to communicate with the CPU, memory or other devices in the computer system.

Thus, according to the present invention, the CPU may be operable to generate cycles on the primary PCI bus to communicate with a peripheral device, wherein the peripheral device may be coupled to either the primary PCI bus or the secondary PCI bus. In addition, software developed to communicate with a peripheral device coupled to the primary PCI bus of the host computer may also be used to communicate with the peripheral device regardless of whether the peripheral device is coupled to the primary PCI bus or the secondary PCI bus. Thus, to the CPU, the one or more peripheral devices coupled to the secondary PCI bus may appear coupled to the primary PCI bus. Stated another way, the one or more peripheral devices coupled to the secondary PCI bus are virtually coupled to said primary PCI bus.

Figure 2A:
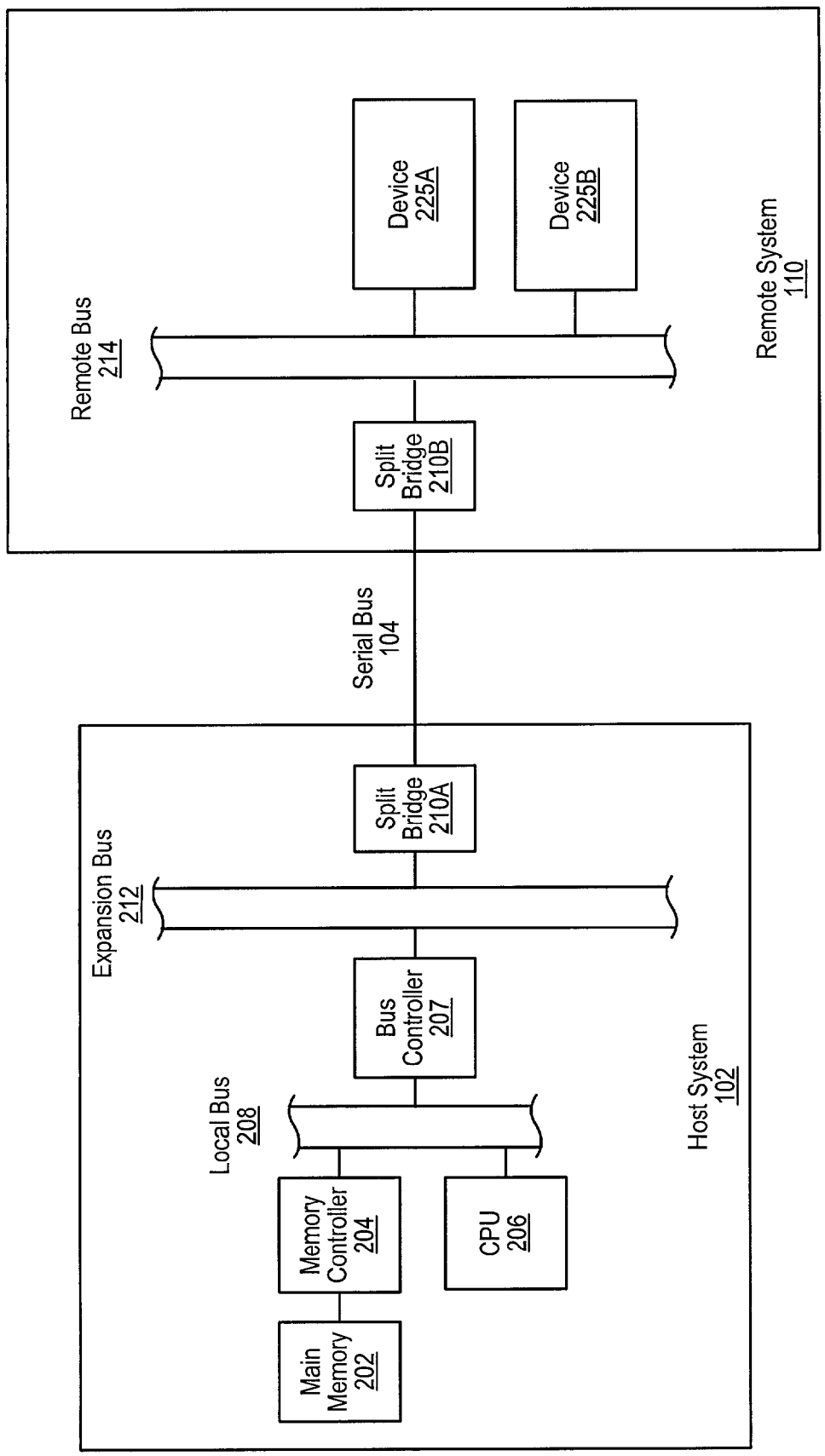
FIGS. 2A–2C are block diagrams of embodiments of the system of FIG. 1.
Figure 2B:
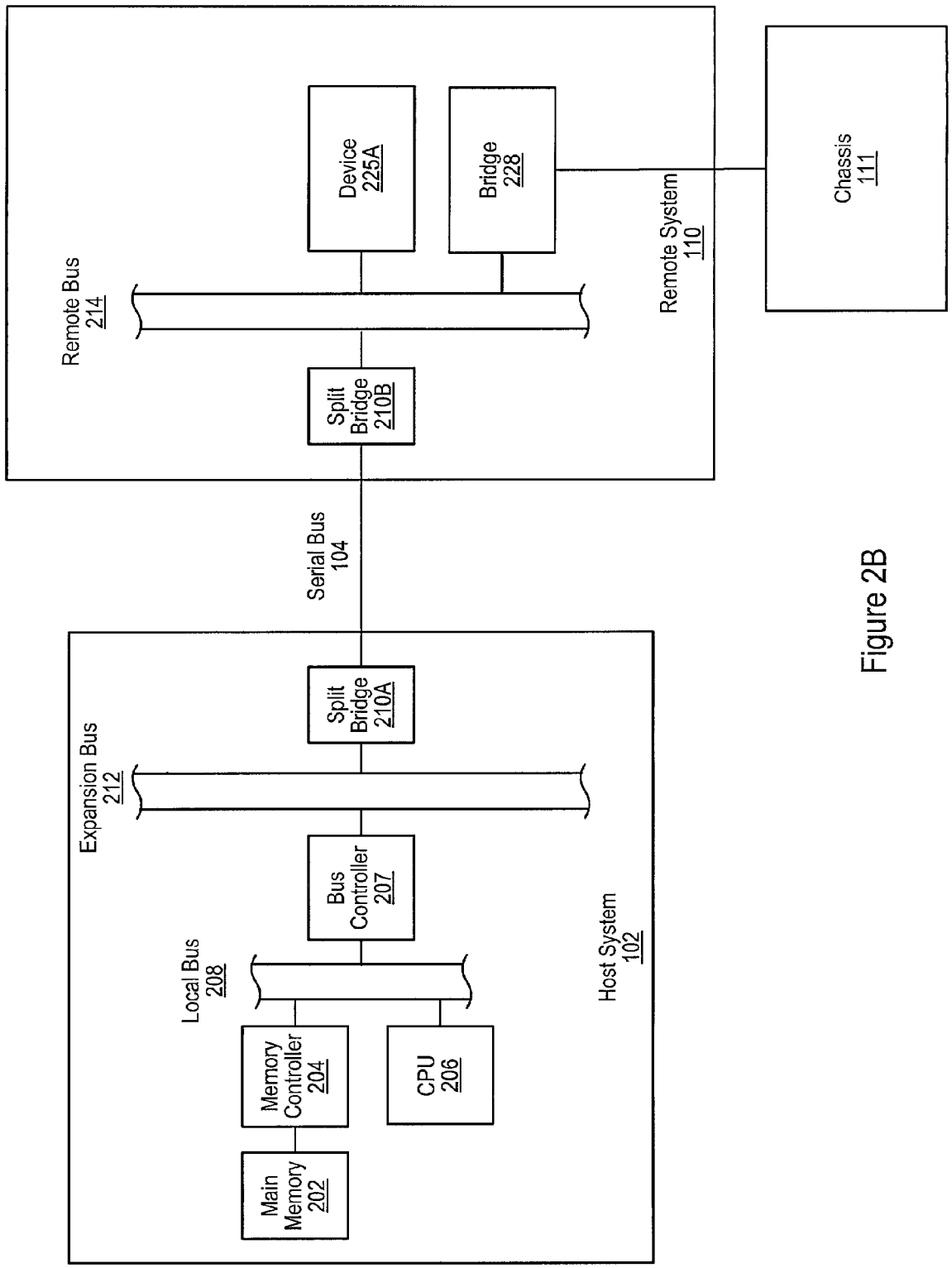
Figure 2C:
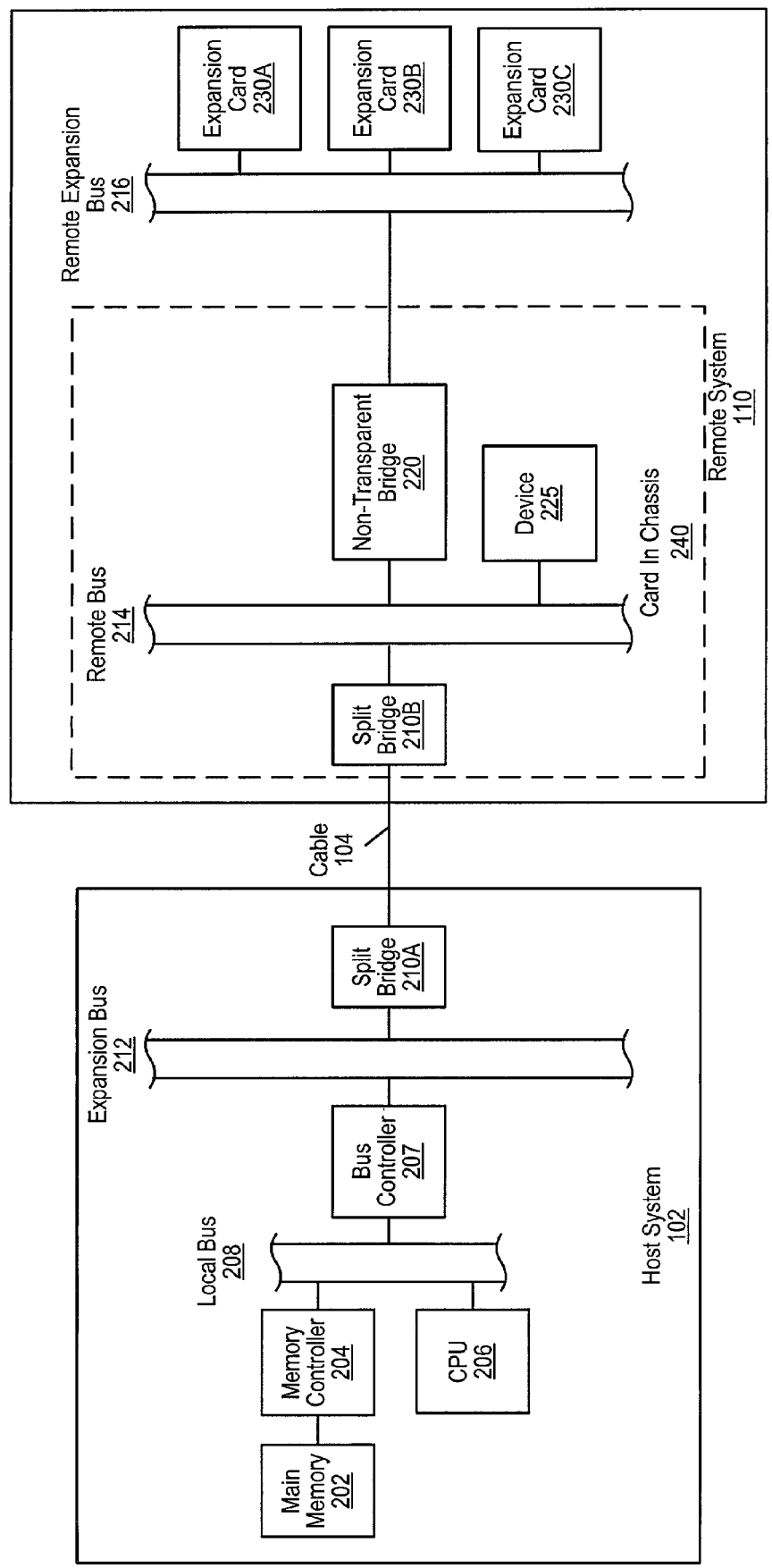

FIGS. 2A–2C—Block Diagrams of Split Bridge Distributed Systems

FIGS. 2A–2C are block diagrams of various embodiments of the distributed system described above with reference to FIG. 1. It should be noted that these embodiments are illustrative and are not intended to limit the invention to any particular configuration. In each of the embodiments shown, a host computer system 102 is coupled to a remote system 110 comprising a chassis and one or more devices or expansion cards. It is noted that any type of computer system configuration or architecture can be used in conjunction with the system and method described herein, as desired, and FIGS. 2A–2C illustrate a representative PC embodiment. It is also noted that the computer system may be implemented on a VXI card installed in a VXI chassis, a computer implemented on a PXI card installed in a PXI chassis, or other types of embodiments. The elements of a computer not necessary to understand the present invention have been omitted for simplicity.

The host computer system 102 includes at least one central processing unit or CPU 206 which is coupled to a local bus (processor or host bus) 208. The CPU 206 may be any of various types, including an x86 processor, e.g., a Pentium class, a PowerPC processor, a CPU from the SPARC family of RISC processors, as well as others. Main memory 202 is coupled to the host local bus 208 by means of memory controller 204. The main memory 202 may store one or more computer programs or libraries according to the present invention. The main memory 202 also stores operating system software as well as the software for operation of the computer system, as is well known to those skilled in the art.

The local bus 208 is coupled to an expansion or input/output bus 212 by means of a bus controller 207 or bus bridge logic. The expansion bus 212 is preferably the PCI (Peripheral Component Interconnect) expansion bus, although other bus types can be used. The expansion bus 212 may include slots for various devices such as data acquisition boards, GPIB interface cards, video display subsystems, hard drives, and so forth. The expansion bus 212 couples to a split bridge 210A which comprises the primary or host split bridge of the distributed system. The primary split bridge 210A may couple via a transmission medium, such as a transmission cable 104 or a network, to the remote system 110, various embodiments of which are described below.

FIG. 2A illustrates a simple embodiment of the invention where the remote system 110 comprises a remote split bridge 210B, which is coupled to the primary split bridge 210A via serial bus 104. In one embodiment, the remote split bridge 210B may couple to a remote bus 214, as shown. The remote bus 214 is preferably a PCI bus, although other PCI based buses (e.g., CPCI, PCI-X, PXI, etc.) may be used. The remote bus 214 may be operable to couple to one or more devices 225, thereby providing for communication between the devices 225 and the host system 102. In one embodiment, the remote system 110 may comprise a chassis which includes slots for receiving expansion cards, and thus, the devices 225 may be in the form of expansion cards, and may include any of various instruments or components as desired.

The split bridge 210 may provide transparent PCI extension between the host computer 102 and the remote system 110, and so expansion cards may appear to the host computer 102 as though they are directly plugged into its expansion (PCI) bus 212. Said another way, the split bridge 210 is a transparent bridge between the host system 102 and the remote bus 214. Further details of the split bridge 210 are presented below with reference to FIG. 3.

In this transparent (split) bridge distributed system, the system software (for example, the BIOS or OS) executing on the host computer system 102 may perform resource assignment for the entire system (the devices or expansion cards 225 in the remote chassis 110). This resource assignment is typically performed only when the host computer is booted. Because of the role of system software, for any devices coupled transparently to the host, any remote system or chassis reconfiguration that is independent of the host computer (i.e., does not entail a host reboot) may be subject to the following restrictions:

1. When the host computer is rebooted, any expansion card type that the user wishes to operate at any time, present or future (including remote chassis reconfiguration), must be present. This restriction has the following ramifications:

2. New expansion cards cannot be added to the system without rebooting the host computer. For example, if the host computer is booted, and four expansion cards are present, then the remote chassis cannot be reconfigured with five or more devices without a full reboot.

3. Expansion cards should only be replaced with cards of the same "type". Cards with the same type will request resources identical to the card they replace. For example, if card A requests 1 k of PCI memory space and one interrupt level, then it should only be replaced with card B if card B also requests 1 k of PCI memory space and one interrupt level.

Thus, in this embodiment of the invention, the reconfiguration (without host reboot) of the devices 225, i.e., the remote bus devices, may be restricted to a restoration of configuration information after power-cycling the remote system 110. An exemplary application of this embodiment relates to manufacturing testing, where substantially identical expansion cards 225 are successively inserted into the remote chassis 110, tested, then replaced with the next card to be tested. As mentioned above, in prior art systems which do not support hot plugging of the expansion cards, replacing a card generally requires rebooting the host computer system 102. In contrast, the embodiment illustrated in FIG. 2A allows the cards 225 to be replaced without host reboot, which may substantially increase the efficiency of testing operations. Another example of an application of the embodiment shown in FIG. 2A relates to hardware debugging, where a user may need to repeatedly change out or power down a particular card 225 to debug the card and/or its interactions with the host system 102. Avoiding a host reboot each time the card is removed and replaced may save substantial time and effort on the part of the user.

FIG. 2B illustrates a variant of the system of FIG. 2A, where one of the devices coupled to the second, or remote, bus 214 comprises a bridge 228. Additionally, another remote chassis 111 may be coupled to the bridge 228. In one embodiment, the additional chassis 111 may be substantially the same as the remote chassis 110. It should be noted that the bridge 228 may be considered as simply another restorable device coupled to the remote bus 214, and thus, is subject to the restriction mentioned above. In one embodiment, the bridge 228 is a transparent bridge where the chassis 111 (and any associated expansion cards) appears to the host computer 102 as though it is directly plugged into the host, or first, expansion (PCI) bus 212. This embodiment is constrained by the restrictions listed above with reference to FIG. 2A. Thus, the chassis 111, or any expansion cards contained therein, may only be replaced with (substantially) identical components, after which the system may restore their respective configurations.

In another embodiment, the bridge 228 may comprise a non-transparent bridge, in which the address space of the chassis 111 is distinct from that of the host 102 and remote bus 214. In this case, any expansion cards comprised in the chassis 111 may be reconfigured as desired without the necessity of powering down the host computer system 102. In other words, the restrictions noted above may not apply. Further details of the use of a non-transparent bridge are presented below with reference to FIG. 2C.

It is noted that in other embodiments, additional bridges and chassis may be daisy-chained off of the chassis 111 in like manner, where the transparent/non-transparent nature of the bridges determines the scope of or restrictions on the reconfigurability of the additional devices. For example, where a series of chassis 111 are daisy-chained via bridges, and one of the bridges is non-transparent, full reconfigurability of any chassis and expansion cards downstream from the non-transparent bridge is supported.

FIG. 2C is a block diagram of an exemplary embodiment of the invention, wherein maximum reconfigurability is supported. In this embodiment, a non-transparent bridge 220 couples the second, or remote, bus 214 to a second, or remote, expansion bus 216. As FIG. 2C shows, in one embodiment, the split bridge 210B, the remote bus 214, and the non-transparent bridge 220 (as well as any attached devices 225) may be comprised on a card 240 inserted into the remote chassis 110. The remote expansion bus 216 may be operable to couple to one or more expansion cards 230. As mentioned before, the host expansion bus 212 and the remote bus 214 are preferably PCI or PCI based buses. In contrast, due to the use of the non-transparent bridge 220, the remote expansion bus 216 may be any type of bus desired. For example, the remote expansion bus 216 may be a VXI bus supporting operation of one or more VXI expansion cards or instruments 230.

The non-transparent bridge 220 also permits the devices or expansion cards 230 coupled to the remote bus 216 to be reconfigured as desired. In other words, the restrictions noted above do not apply to components coupled to the host system 102 by the non-transparent bridge 220. Thus, in this embodiment, the user may power down the remote system 110, configure, replace, add, or remove any of the expansion cards 230 coupled to the remote expansion bus 216, and power up the remote system 110, all without having to reboot the host system 102. Thus, the number of expansion cards 230 may be changed, and replacement cards needn't be the same type as the cards they replace.

Details of the operation of a split-bridge distributed system are described below with reference to FIGS. 4 and 5.

Figure 3:
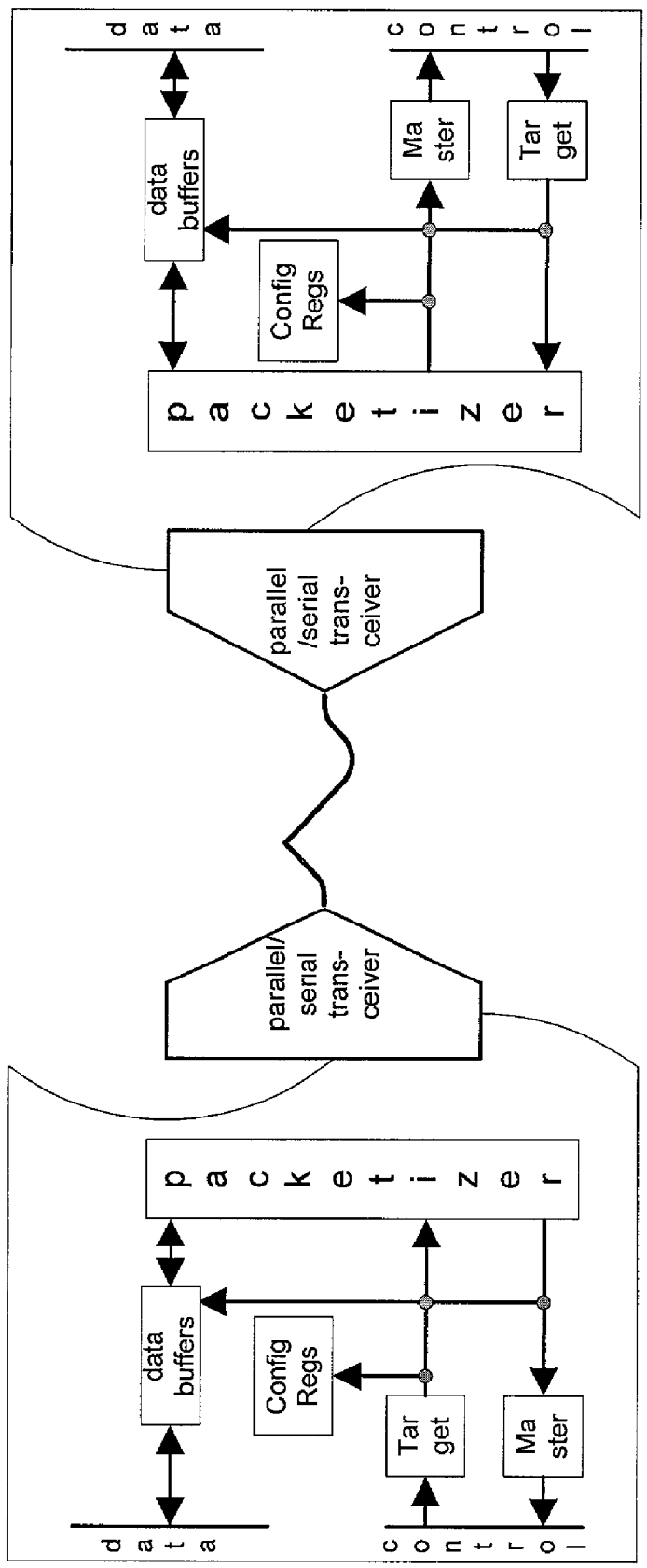
FIG. 3 is a block diagram of a PCI—PCI split bridge, according to one embodiment.

FIG. 3: A PCI—PCI Split Bridge

FIG. 3 is a block diagram that illustrates one embodiment of the internal architecture of the PCI—PCI split bridge, described above with reference to FIG. 1. The two parts of the split bridge may comprise a host side bridge, referred to as the primary bridge or interface, and a remote side bridge, referred to as the secondary bridge or interface. In one embodiment, the primary and secondary bridges are each a complete bridge, where the two bridges function together as a transparent bridge. In another embodiment, the primary and secondary bridges may each comprise only a portion of a bridge, where the two bridge portions operate together as a transparent bridge.

Shown in the diagram are four state machines, six transaction queues, and the interfaces to the PCI bus and to the parallel interface. The four state machines include a PCI Slave State Machine, a PCI Master State Machine, a Serial Transmitter State Machine, and a Serial Receiver State Machine. The transaction queues may include a retransmit queue, a delayed transaction storage queue, a data queue used on the PCI to serial portion, and a data queue used on the serial to PCI portion. For more information on the PCI—PCI split bridge, please see U.S. patent application Ser. No. 09/092,342 entitled "Wide Area Serial PCI System And Method For Connecting Multiple PCI Buses", which is incorporated by reference above.

Figure 4:
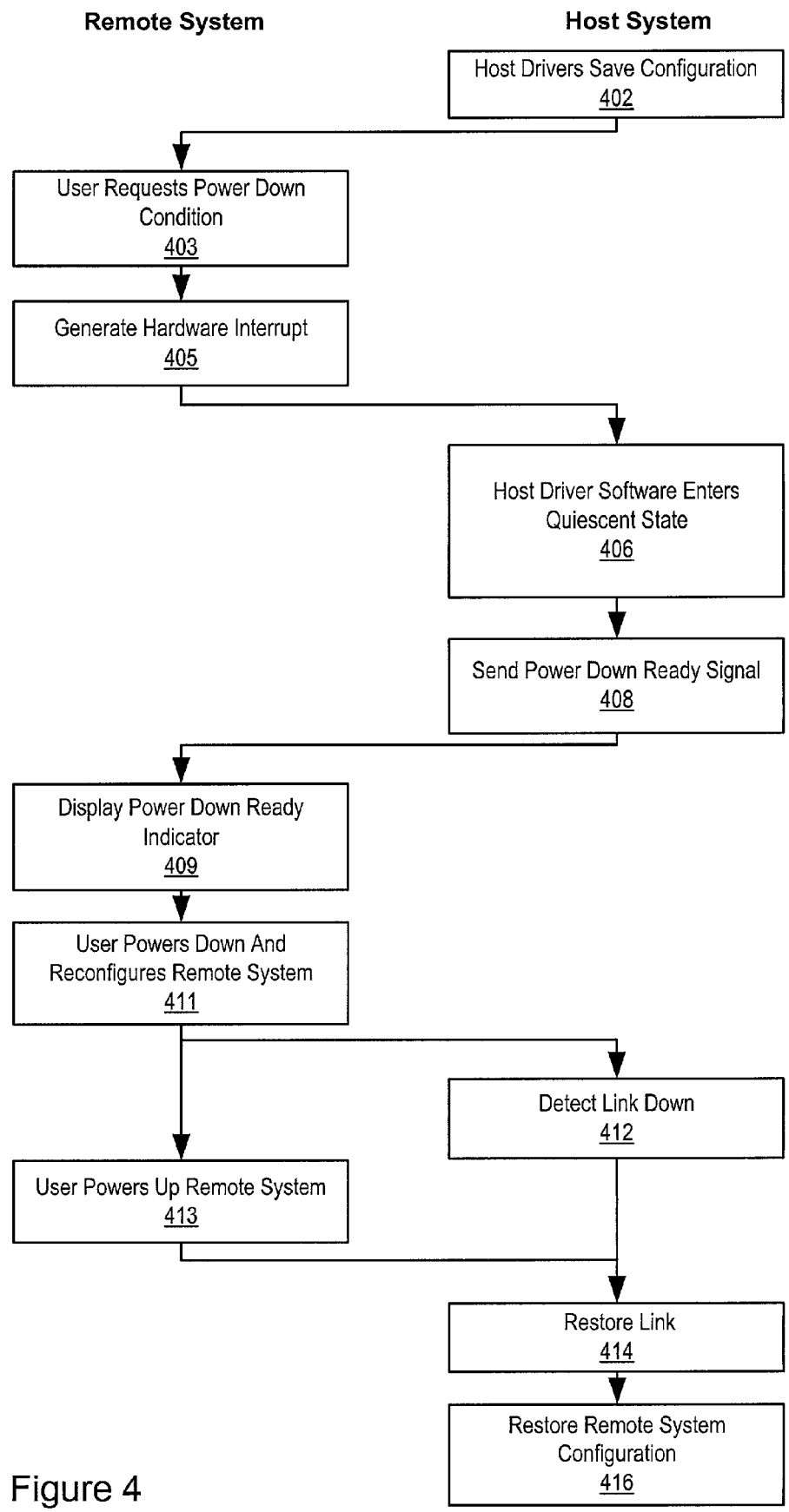
FIG. 4 is a flowchart of a reconfiguration process for a remote system in a distributed environment, according to one embodiment.

FIG. 4: Flowchart of a Reconfiguration Process for a Remote System in a Distributed System FIG. 4 is a flowchart of a reconfiguration process for an embodiment of the distributed system described above with reference to FIG. 2A. It is noted that in various embodiments, one or more steps may occur in a different order that shown, or may be omitted. Furthermore, one or more additional steps may be performed as desired. As indicated in FIG. 4, some of the operations or steps in the process are performed by the host computer 102 (the even numbered steps), while others are performed by the remote system 110 (the odd number steps), although in various embodiments, some steps may be performed by either.

As FIG. 4 shows, in 402 host device drivers may save configuration information for one or more devices on the remote bus 214.

Then, in 403 the user may request a power down condition for the remote system (chassis) 110. In other words, there is a need to power down the remote system 110 in order to reconfigure it. In one embodiment, the power down request may be indicated by the user pressing a button on the remote system 110, for example, a button on a card in the remote chassis 110. In another embodiment, the power down request may be indicated by user input to the remote system 110 indicating a request for a power down condition. For example, the user input may be entered by the user through a user interface to the remote system 110. Alternately, the user input may be in the form of a signal transmitted to the remote system 110 through wired or wireless means. In another embodiment, the power down request may be indicated by the user ejecting a card from the remote system (chassis) 110. In yet another embodiment, the power down request may be indicated by any of the above methods applied to the host system 102, e.g., a button on the host computer system 102.

In 405, a indication of a power down condition, e.g., a hardware interrupt (or software equivalent), may be generated in response to the power down request by the user. In one embodiment, a hardware interrupt may be generated by the remote system 110, e.g., by a card in the remote chassis 110, and transmitted over the serial bus 104 to the host computer system 102.

Then, in 406 the host driver software may enter a quiescent state in response to the indication of the power down condition of 404. While in the quiescent state, the host driver software may not perform transactions with the remote system 110 (other than that described below in 408). In one embodiment, the host driver software (i.e., the drivers for the devices in the remote system 110) entering a quiescent state may include putting the corresponding devices in the remote system 110 into a quiescent state. For example, disabling the ability of the devices to send an interrupt.

In 408, a power down ready signal may be sent from the host system 102 to the remote system 110, and in 409, a power down ready indicator may be displayed on the remote system 110 in response to the signal. In one embodiment, the power down ready signal may be sent from the host system 102 to the remote system 110 as part of step 406. In other words, in one embodiment, the host driver software (i.e., the drivers for the devices in the remote system 110) entering a quiescent state may include sending the power down signal to the remote system 110.

In response to the power down ready indicator, the user may power down and reconfigure the remote system 110, as indicated in 411. It should be noted that in this embodiment, the reconfiguration is restricted as set forth above with reference to FIG. 2A. In other words, the number of devices on the remote bus 214 may not change, and any replacement of devices or expansion cards (including any bridge coupled to the remote bus 214) must be by devices or cards of the same type.

In one embodiment, the user may reconfigure the remote system 110 by exchanging at least one card (coupled to the remote bus 214) on the remote chassis 110 with a new card of the same type. In other embodiments, the user may just modify hardware and/or software settings on the remote system 110 or any of the devices coupled to the remote bus 214.

In 412, a link down condition between the host computer system 102 and the remote system 110 may be detected. In other words, when the user powers down the remote system 110 in 411, the link between the host computer system 102 and the remote system 110 is broken or brought down, which may then be detected by the system.

In 413, the user may power up the remote system 110. More specifically, the remote system 110 may be powered up after being reconfigured as described in 411.

Then, in 414 the link between the host computer system 102 and the remote system 110 may be restored, resulting in a link up condition. The link up condition may then be detected by the system.

In one embodiment, the system may poll to determine the status of the link between the host computer system 102 and the remote system 110. The link status may comprise either the link down condition or a link up condition between the host computer system 102 and the remote system 110. In one embodiment, the polling may comprise polling a register included on the host computer system 102 to determine the link status. In various embodiments, the register may be included on any of the host computer motherboard, a bus controller card or interface card on the host computer system 102, the primary bridge, or any other component included in the host computer system 102.

In another embodiment, a user interface may be presented whereby the user may notify the system that the link has been restored. In another embodiment, a combination of a user interface and polling the status of the link may be used by the system to detect the link up condition. Thus, after the user powers up the remote system 110 in 413, the link between the host computer system 102 and the remote system 110 may be re-established, and the resulting link up condition detected by the system.

In one embodiment, the system may poll to determine the status of the link between the host computer system 102 and the remote system 110. In one embodiment, the polling comprises polling a register included on the host computer system 102 to determine the link status. In various embodiments, the register may be included on any of the host computer motherboard, a bus controller card or interface card on the host computer system 102, the primary bridge, or any other component included in the host computer system 102. The link status comprises either the link down condition or a link up condition between the host computer system 102 and the remote system 110.

Finally, in 416 the configuration of the remote system 110, i.e., of the devices on the remote host, may be restored using the configuration information which was saved in 402 above.

Thus, in a distributed system which does not inherently support hot plugging of expansion cards, the use of the split bridge 220 allows power cycling operations to be performed on the remote system 110 without the need to power down the host computer system 102, thereby allowing limited reconfiguration of the remote devices. As mentioned above, this process may be useful for applications such as manufacturing testing, and hardware debugging.

Figure 5:
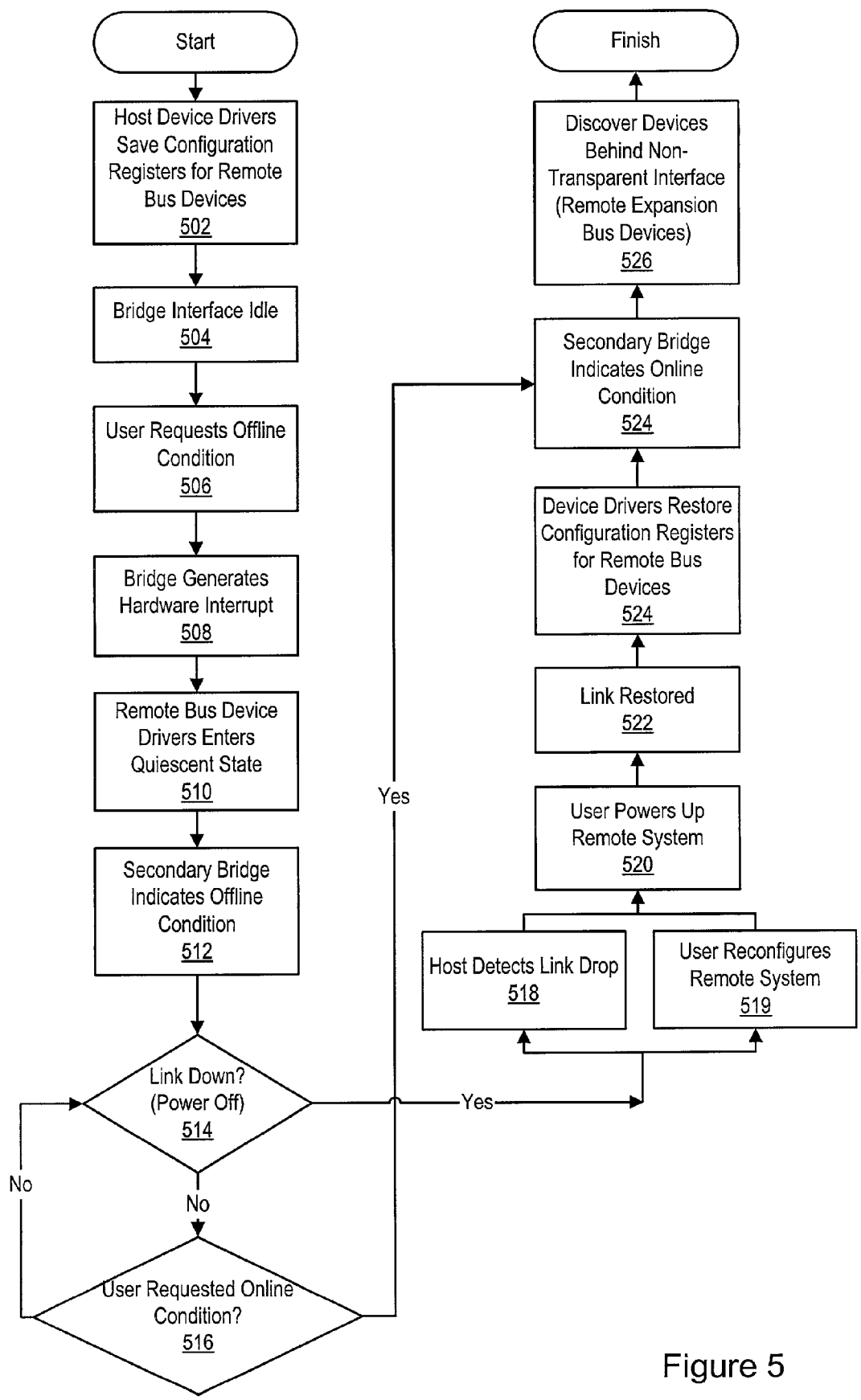
FIG. 5 is a flowchart of another embodiment of a reconfiguration process for a remote system in a distributed environment.

FIG. 5—Detailed Flowchart of a Reconfiguration Process for a Remote Device in a Distributed System FIG. 5 is a flowchart of a reconfiguration process for the system described above with reference to FIG. 2C, according to one embodiment. It should be noted that the method presented with reference to FIG. 5 includes the method described with reference to FIG. 4. In other words, the method operations of FIG. 5 comprise a superset of the method operations of FIG. 4. As mentioned above, in some embodiments, various of the steps may occur concurrently, in a different order than shown, or may be omitted. Furthermore, one or more additional steps may be performed as desired. As mentioned above, although in this embodiment, the second system is described as a remote system, in other embodiments the second system may be proximate to the host computer system (i.e., the first system).

In the "Start" state, the system is assumed to be idle.

As FIG. 5 shows, in 502 the host device drivers may save (the contents of) configuration registers for devices (225 and/or 220) on the remote bus 214. Note that 502 is substantially the same as step 402 above. In one embodiment, the configuration registers may be saved after device drivers are loaded, for example, during the back end of the operating system (OS) boot process. Thus, after the device drivers are loaded, each device driver may save its respective device's (expansion module's or card's) configuration registers. After the device drivers are loaded, applications can communicate with the remote system 110 (devices in the remote chassis 110).

As indicated in 504, the split bridge interface is preferably idle prior to the user request to reconfigure the remote chassis in 506 below. Said another way, in the preferred embodiment, there can be no PCI traffic across the split bridge interface during the request.

In 506, the user may request to bring the bridge interface "offline", i.e., to communicatively decouple the remote system 110 from the host computer system 102. This request correlates to the request for power down condition in the method of FIG. 4. It is noted that this request is made when the user is interested in reconfiguring devices 220, 225, and/or 230 in the remote chassis 110 without rebooting the host computer 102. Said another way, the user may request a power down condition.

In one embodiment, the user may bring the system offline using a hardware mechanism on the secondary interface (e.g., a switch, button, etc., on the remote system 110). The request to take the bridge interface offline may also take the form of the user adding or removing a card from the remote system.

If a hardware mechanism is used to request that the bridge interface be taken offline, then in 508 the bridge may assert a hardware interrupt to notify the host of the offline request, i.e., the bridge may generate an indication of the power down condition to the host computer. In another embodiment, the user may request to take the system offline using software running on the host computer system 102. If the software notification mechanism is used, the software may perform a function similar to the hardware interrupt, e.g., via a software interrupt or a message, asserting that the user has requested that the system be taken offline. In other words, the software may generate an indication of the power down condition to the host computer.

In 510, the device drivers for the devices may enter a quiescent state. In one embodiment, this state may result from the following process: the split bridge device driver may detect the user's request, i.e., a "request offline" condition may be detected. The split bridge device driver may then notify other device drivers of the condition. For example, the split bridge device driver may trigger an "offline event" for each of the other device drivers. In this manner, the offline event may be passed to all device drivers for the expansion cards. When each device driver receives this event, the driver may disable the expansion card's ability to assert an interrupt and perform any additional operations necessary for placing the device driver into a quiescent state. Disabling interrupts may prevent a shared PCI interrupt from attempting to access a register on a remote device (expansion card) 230 once the link is down. In other words, in a quiescent state, the driver preferably disallows register access to the expansion card.

Once device drivers have entered a quiescent state, the secondary interface may indicate the offline condition (i.e., the power down ready indicator) using an "Online/Offline" LED or some other visual indicator, as indicated in 512. In one embodiment, the host may indicate that the bridge interface is offline using an application, e.g., via a graphical user interface (GUI) program which is operable to display the status of the bridge interface.

Once the bridge interface is offline, the device drivers may remain idle until the remote chassis is brought back online. During this time, the bridge device driver may keep track of the link status, as shown in 514. In one embodiment, the bridge device driver may track the link status by polling a status register. In another embodiment, the bridge device driver may listen for a link status interrupt. In other embodiments, other means of tracking the link status may be used as desired.

When the user powers down the remote chassis, the link between the primary and secondary interfaces is lost. At this point, as shown in 518, the bridge device driver may detect that the link is lost, and the other device drivers may continue to disallow access to their respective expansion cards.

In 519, while power to the remote system 110 is off, the user may reconfigure the devices (expansion cards) in the remote chassis 110. As FIG. 5 indicates, in one embodiment, steps 518 and 519 may be performed in parallel. As described above with reference to FIG. 2A, the reconfiguration operations allowed may be restricted, depending on the nature of the bridge coupling the devices or expansion cards to the host computer. As noted above, any devices or expansion cards on the remote bus 214 are restricted to power-cycling or replacement with a card or device of the same type, unless subsequent non-transparent bridges couple the devices to the remote bus, as described above with reference to FIG. 2B. In contrast, the cards 230 on the remote expansion bus 216 may be reconfigured as desired, including adding, removing, swapping, or any other reconfiguration.

In 520, when the user has finished reconfiguring the remote chassis, i.e., one or more of the devices or expansion cards comprised in the remote chassis, power may be restored to the remote system 110. In one embodiment, a button or switch on the remote system 110 may be provided for power-cycling.

Then, in 522, after power is restored to the remote system 110, the bridge interface may automatically restore the link between the primary and secondary interfaces, thus reestablishing communications between the host computer system 102 and the remote system 110. In one embodiment, after the link has been restored, the bridge device driver may be notified of the link restoration by polling a link status register or by listening for a link status interrupt. In another embodiment, the bridge device driver may be notified of the link being restored by receiving a message from the secondary interface. In another embodiment, a user interface may be presented whereby the user may notify the system that the link has been restored. In yet another embodiment, a combination of a user interface and polling the status of the link may be used by the system to detect the link up condition.

Then, in 522, after power is restored to the remote system 110, the bridge interface may automatically reestablish the link between the primary and secondary interfaces, thus reestablishing communications between the host computer system 102 and the remote system 110. In one embodiment, after the link has been reestablished, the bridge device driver may be notified of the link being restored by polling a link status register or by listening for a link status interrupt. In another embodiment, the bridge device driver may be notified of the link being restored by receiving a message from the secondary interface.

In 524, the device drivers of devices or cards on the remote bus 214 (including any non-transparent bridge 220 or transparent bridge 228) may be notified that the link is reestablished and restore the state of their respective devices or expansion cards (including any bridges). In a preferred embodiment, the PCI configuration registers (which were saved in 502 above) are restored first so that communication with the remote system 110 is possible, then device-specific registers are restored, enabling communication with the specific devices on the remote bus 214.

In 526, after the link is reestablished, the secondary bridge (the portion of the split bridge comprised in the remote system 110) may indicate that the bridge is online by illuminating an "Online" LED (or by restoring the state of whatever visual indicator was used in 512 above). In other words, the remote system may indicate that the host device driver software (e.g., the driver software for the remote bus devices) is no longer in a quiescent state.

Finally, in 528, the host system may discover the devices or expansion cards behind the non-transparent bridge or interface 220. In other words, the host system 102 may perform a discovery process for the devices or expansion cards on the remote expansion bus 216. In one embodiment, the discovery process may include detection of the devices, querying the devices for resource requirements, and assigning the required resources to the devices.

Referring back to 514, if the bridge device driver determines that the link is not down, then in 516, the bridge device driver may determine whether the user has requested an online condition. If the bridge device driver determines that the user has not requested an online condition, then the bridge device driver may continue to monitor the link status, as indicated in 514.

If, in 516, the bridge device driver determines that the user has requested an online condition, then in 526, the secondary interface may indicate that the bridge is online, e.g., by illuminating an "Online" LED, as described above, followed by the discovery process described above in 528.

In one embodiment, the computer system (i.e., the host system) may include a first bus (e.g., a first PCI bus) and a first interface (e.g., a primary interface) coupled to the first bus, where the first interface includes first bus interface circuitry (e.g., PCI interface circuitry) for interfacing to the first bus. A remote device, which may be located remotely from the computer system, may include a second bus (e.g., a second PCI bus), one or more devices, e.g., peripheral devices, coupled to the second bus, and a second interface (e.g., a secondary interface) coupled to the second bus, where the second interface includes second bus interface circuitry (e.g., PCI interface circuitry) for interfacing to the second bus. A serial bus may couple the first interface and the second interface. In other words, the serial bus may includes first and second ends, where the first end of the serial bus is coupled to the first interface and the second end of the serial bus is coupled to the second interface.

The first interface and the second interface may operate as a single bridge. In other words, the first interface may operate as a first portion of the bridge, and the second interface may operate as a second portion of the bridge. For example, the first interface and the second interface may collectively implement a single bridge register set of the single bridge. Thus, in the PCI system, the primary interface and the secondary interface may operate as a single PCI—PCI bridge, where the primary interface operates as a first portion of a PCI—PCI bridge, and the secondary interface operates as a second portion of the PCI—PCI bridge. For example, the primary interface and the secondary interface may collectively implement a PCI—PCI bridge register set.

A first device (e.g., a first peripheral device) may then be operable to be coupled to the second bus of the remote device and may be operable to interoperate with the computer system without requiring rebooting of the computer system. In other words, the first device may be added to the remote device, and may function (in conjunction with the computer system) without the need to reboot the computer system.

In one embodiment, the first device coupled to the second bus of the remote device may be operable to be replaced with a second device coupled to the second bus of the remote device. The second device may then be operable to interoperate with the computer system without requiring rebooting of the computer system. In one embodiment, the second device may be the same type as the first device, as described above.

In one embodiment, the first system (the host computer system) may be operable to communicate with the second, or remote, system in the following manner: a first bus signal may be generated on the first bus and transmitted to the first interface, i.e., the first portion of the split bridge. The first interface may convert the first bus signal into a form suitable for transmission over the communication medium. For example, if the communication medium is a serial bus, then the first bus signal may be converted into serial data. The first interface may then transmit the converted bus signal to the second interface over the communication medium. The second interface may receive the converted bus signal, e.g., the serial data, and may convert the received converted bus signal to a form suitable for transmission to the second bus, i.e., the remote bus comprised in the second system, thereby generating a second bus signal. The second interface may then transmit the second bus signal to the second (remote) bus comprised on the second system.

Thus, the system and method described above provide for reconfiguration of a second, e.g., remote, system in a split bridge distributed environment such that any configuration changes made to the second system (e.g., devices or expansion cards in the remote chassis) may automatically be made known to the host computer system (the first system), enabling such reconfiguration to be made without powering down the host computer system. The split bridge may include two portions: a first portion, or primary interface, in the host computer system, and a second portion, or secondary interface, in the second system. Thus, the system and method uses a split bridge plugged into a non-hot-plug host bus to provide power cycling features and functionality to an expansion bus in the second, e.g., remote, system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for reconfiguring a second system in a system comprising a host computer system coupled to the second system through a split bridge, wherein the split bridge comprises a first interface comprised in the host computer system, a second interface comprised in the second system, and a communication medium coupling the first interface and the second interface, wherein the first interface, the second interface, and the communication medium collectively comprise the split bridge, and wherein the host computer system includes host driver software, the method comprising:

the host computer system saving configuration information for the second system;

receiving user input requesting a power down condition for the second system;

the second system generating an indication of the power down condition to the host computer system in response to said user input;
the host computer receiving the indication of the power down condition;
the host driver software entering a quiescent state after receiving the indication;
powering down the second system, wherein the second system is operable to be reconfigured by a user after said powering down;
powering up the second system after said powering down and after the second system has been reconfigured by a user;
the host computer system detecting said powering up of the second system; and
the host computer system restoring second system configuration using said configuration information.

2. The method of claim 1,
wherein said receiving user input comprises receiving user input at the second system.

3. The method of claim 1, wherein the host computer system is operable to communicate with the second system by:
generating a first bus signal on a first bus comprised in the host computer system;
transmitting the first bus signal to the first interface;
the first interface converting the first bus signal into a form suitable for transmission over the communication medium;
the first interface transmitting the converted bus signal to the second interface over the communication medium;
the second interface receiving the converted bus signal;
the second interface converting the received converted bus signal to a form suitable for transmission to a second bus comprised in the second system, thereby generating a second bus signal; and
the second interface transmitting the second bus signal to the second bus comprised on the second system.

4. The system of claim 3, wherein each of the first interface and the second interface include parallel/serial transceivers for converting parallel data generated on the first bus and second bus, respectively, to data in a form suitable for transmission on the communication medium and for converting data received from the communication medium to parallel data for generation on the first bus and second bus, respectively.

5. The system of claim 4, wherein the communication medium comprises a serial bus.

6. The method of claim 1,
wherein the first interface and the second interface collectively implement a register set of the split bridge.

7. The method of claim 1,
wherein the first interface and the second interface operate as a single PCI—PCI bridge;
wherein the first interface and the second interface collectively implement a PCI—PCI bridge register set; and
wherein the first interface operates as a first portion of a PCI—PCI bridge, and wherein the second interface operates as a second portion of the PCI—PCI bridge.

8. The method of claim 1,
wherein the second system comprises a remote system remotely located relative to the host computer system.

9. The method of claim 8,
wherein the second system comprises a remote system located more than about 2 meters from the host computer system.

10. The method of claim 1, wherein said powering down the second system comprises deactivating a link between the host computer system and the second system, the method further comprising:
the host computer system detecting a link down condition between the host computer system and the second system after said powering down the second system; and
the host computer system polling to determine a link status, wherein the link status comprises either the link down condition or a link up condition between the host computer system and the second system.

11. The method of claim 10, wherein said powering up the second system comprises reactivating the link between the host computer system and the second system; and
wherein said host computer system detecting said powering up further comprises the host detecting the link up condition between the host computer system and the second system.

12. The method of claim 1, wherein said polling to determine a link status comprises polling a register to determine the link status, wherein the register is comprised on the host computer system.

13. The method of claim 1, wherein said indication of the power down condition comprises a hardware interrupt.

14. The method of claim 1, wherein said indication of the power down condition is performed with a software function.

15. The method of claim 1, further comprising:
the host computer system sending a power down ready signal to the second system after said the host driver software entering a quiescent state and prior to said powering down the second system; and
the second system displaying a power down ready indicator in response to said sending.

16. The method of claim 1,
wherein said saving configuration information for the second system comprises saving configuration for a first one or more devices comprised in the second system; and
wherein said restoring second system configuration using said configuration information comprises restoring configuration for said first one or more devices comprised in the second system.

17. The method of claim 16, wherein said reconfiguring the second system comprises replacing at least one of said first one or more devices with a device of the same type.

18. The method of claim 16,
wherein at least one of said first one or more devices comprises a non-transparent bridge;
wherein said second system further comprises a second one or more devices coupled to said non-transparent bridge through an expansion bus comprised in the second system; and
wherein said reconfiguring the second system comprises reconfiguring said second one or more devices.

19. The method of claim 18, wherein said reconfiguring said second one or more devices comprises one or more of:
removing one or more of said second one or more devices;
adding one or more devices to said second one or more devices;
replacing one or more of said second one or more devices with respective other devices; and
swapping one or more of said second one or more devices.

20. The method of claim 19, wherein said second system comprises a chassis, and wherein at least a subset of said first one or more devices and said second one or more devices comprise cards inserted into said chassis.

21. The method of claim 20, wherein said user reconfiguring the second system comprises exchanging at least one of said cards on the second system.

22. The method of claim 20, wherein said user reconfiguring the second system comprises rearranging one or more of said cards on the second system.

23. The method of claim 18, further comprising:
the host computer system performing a discovery process on the reconfigured second system after said restoring configuration.

24. The method of claim 18, wherein said host computer system performing a discovery process on the reconfigured second system comprises the host computer system performing a discovery process on the second one or more devices.

25. The method of claim 24, wherein said user pressing a button on the second system comprises the user pressing a button on a card comprised in the second system.

26. The method of claim 18,
wherein said host driver software entering a quiescent state comprises the host driver software placing said first one or more devices and said second one or more devices into a quiescent state.

27. The method of claim 18, further comprising:
the second system indicating an online condition after said restoring second system configuration.

28. The method of claim 1, wherein said user requesting a power down condition for the second system comprises the user pressing a button on the second system.

29. The method of claim 1, wherein said user requesting a power down condition for the second system comprises the user entering user input to the second system indicating a request for the power down condition for the second system.

30. The method of claim 1, wherein said user requesting a power down condition for the second system comprises the user ejecting a card from the second system.

31. The method of claim 1, wherein said host driver software does not perform transactions with the second system while in said quiescent state.

32. The method of claim 1, wherein said reconfiguring the second system comprises one or more of: modifying hardware settings on the second system and/or modifying software settings on the second system.

33. The method of claim 1,
wherein said host computer system performing said saving configuration information, said detecting powering up, and said restoring second system configuration comprises:
said host driver software performing said saving configuration information, said detecting powering up, and said restoring second system configuration.

34. The method of claim 1,
wherein the indication of the power down condition comprises an interrupt.

35. A distributed system, the system comprising:
a host computer system, wherein the host computer system comprises:
a CPU; and
a memory;
wherein the memory is operable to store host driver software; and
wherein the CPU is operable to execute the host driver software;
a serial bus which is operable to couple to the host computer system;
a second system which is operable to couple to the host computer system via the serial bus; and
a split bridge, wherein a first portion of the split bridge is comprised in the host computer system, wherein a second portion of the split bridge is comprised in the second system, wherein said first portion is operable to couple to said second portion via said serial bus, and wherein the split bridge is a transparent bridge operable to mediate communication between the host computer system and the second system;
wherein the host computer system is operable to:
save configuration information for the second system
wherein the second system is operable to:
receive user input requesting a power down condition; and
generate an indication of the power down condition in response to said receiving user input requesting the power down condition;
wherein the host driver software is executable to enter a quiescent state in response to the indication of the power down condition; and
wherein the host computer system is operable to:
detect a link down condition between the host computer system and the second system in response to a user powering down the second system to reconfigure the second system;
determine a link status, wherein the link status comprises either the link down condition or a link up condition between the host computer system and the second system;
detect the link up condition between the host computer system and the second system in response to the user powering up the second system after reconfiguring the second system; and
restore second system configuration using said configuration information.

36. The system of claim 35,
wherein host computer system comprises a first bus coupled to said first portion of the split bridge, and wherein said second system comprises a second bus coupled to said second portion of the split bridge; and
wherein each of the first portion and the second portion of the split bridge include parallel/serial transceivers for converting parallel data generated on the first bus and second bus, respectively, to serial data for transmission on the serial bus and for converting data received from the serial bus to parallel data for generation on the first bus and second bus, respectively.

37. The method of claim 35,
wherein the first portion and the second portion of the split bridge collectively implement a register set of the bridge.

38. The method of claim 35,
wherein the first portion and the second portion of the split bridge operate as a single PCI—PCI bridge;
wherein the first portion and the second portion of the split bridge collectively implement a PCI—PCI bridge register set; and
wherein the first portion of the split bridge operates as a first portion of a PCI—PCI bridge, and wherein the second portion of the split bridge operates as a second portion of the PCI—PCI bridge.

39. The method of claim 35,
wherein the second system comprises a remote system remotely located relative to the host computer system.

40. The system of claim 35, wherein, while in said quiescent state, the host driver software is precluded from performing transactions with the second system.

41. The system of claim 35,
wherein in entering a quiescent state, the host computer system is operable to send a power down ready signal to the second system; and
wherein the second system is further operable to display a power down ready indicator in response to said sending.

42. The system of claim 35, further comprising:
a first one or more devices comprised in the second system;
wherein, in saving configuration information for the second system, the host computer system is operable to save configuration for a first one or more devices comprised in the second system; and
wherein, in restoring second system configuration using said configuration information, the host computer system is operable to restore configuration for said first one or more devices comprised in the second system.

43. The system of claim 42, further comprising:
a second one or more devices comprised in the second system;
wherein at least one of said first one or more devices comprises a non-transparent bridge; and
wherein said second one or more devices are coupled to said non-transparent bridge through an expansion bus comprised in the second system.

44. The system of claim 43, wherein the host computer system is further operable to perform a discovery process on the reconfigured second system after restoring second system configuration.

45. The system of claim 43, wherein, in performing a discovery process on the reconfigured second system, the host computer system is operable to perform a discovery process on the second one or more devices.

46. The system of claim 43,
wherein said host driver software entering a quiescent state comprises the host driver software placing said first one or more devices and said second one or more devices into a quiescent state.

47. The system of claim 43, wherein said second system comprises a chassis, and wherein at least a subset of said first one or more devices and said second one or more devices comprise cards inserted into said chassis.

48. The system of claim 47, wherein said reconfiguring the second system comprises exchanging at least one of said cards on the second system.

49. The system of claim 47, wherein said reconfiguring the second system comprises rearranging one or more of said cards on the second system.

50. The system of claim 47, wherein said user input requesting a power down condition for the second system comprises a user initiated ejection of one of said cards from the second system.

51. The system of claim 35, wherein said reconfiguring the second system comprises modifying hardware settings on the second system.

52. The system of claim 35, wherein said reconfiguring the second system comprises modifying software settings on the second system.

53. The system of claim 35, wherein the second system is further operable to indicate an online condition after said restoring second system configuration.

54. The system of claim 35, wherein said second system comprises a button usable by a user to indicate a request for a power down condition for the second system.

55. The system of claim 54, wherein said button is on a card comprised in the second system.

56. The system of claim 35,
wherein said host driver software is executable to perform said saving configuration information, said detecting a link down condition, said polling a register, and said restoring second system configuration.

57. The system of claim 35,
wherein the indication of the power down condition comprises an interrupt.

58. The system of claim 57, wherein said interrupt comprises a hardware interrupt.

59. The system of claim 57, wherein said interrupt is performed with a software function.

60. The system of claim 35, wherein the host computer system is operable to poll a register comprised on the host computer system to determine the link status.

61. A system for connecting peripheral devices to a computer, comprising:
a computer system, wherein the computer system includes a CPU and memory, wherein the computer system includes:
a first bus; and
a first interface coupled to the first bus, wherein the first interface includes first bus interface circuitry for interfacing to the first bus;
a remote device located remotely from the computer system, the remote device comprising:
a second bus;
one or more devices coupled to the second bus; and
a second interface coupled to the second bus, wherein the second interface includes second bus interface circuitry for interfacing to the second bus;
a serial bus coupled between the first interface and the second interface, wherein the serial bus includes first and second ends, wherein the first end of the serial bus is coupled to the first interface and the second end of the serial bus is coupled to the second interface;
wherein the first interface and the second interface operate as a single bridge, wherein the bridge comprises a split bridge;
wherein the first interface and the second interface collectively implement a single bridge register set of the single bridge; and
wherein a first device is operable to be coupled to the second bus of the remote device and is operable to interoperate with the computer system without requiring rebooting of the computer system.

62. The system of claim 61,
wherein a first device coupled to the second bus of the remote device is operable to be replaced with a second device coupled to the second bus of the remote device, and wherein the second device is operable to interoperate with the computer system, without requiring rebooting of the computer system.

63. The system of claim 62, wherein the second device is the same type as the first device.

64. The system of claim 61,
wherein the first interface operates as a first portion of the bridge, and wherein the second interface operates as a second portion of the bridge.

65. A system for connecting peripheral devices to a computer, comprising:

a computer system, wherein the computer system includes a CPU and memory, wherein the computer system includes:
   a first Peripheral Component Interconnect (PCI) bus; and
   a primary interface coupled to the first PCI bus, wherein the primary interface includes PCI interface circuitry for interfacing to the first PCI bus;
a remote device located remotely from the computer system, the remote device comprising:
   a second PCI bus;
   one or more peripheral devices coupled to the second PCI bus; and
   a secondary interface coupled to the second PCI bus, wherein the secondary interface includes PCI interface circuitry for interfacing to the second PCI bus;
a serial bus coupled between the primary interface and the secondary interface, wherein the serial bus includes first and second ends, wherein the first end of the serial bus is coupled to the primary interface and the second end of the serial bus is coupled to the secondary interface;
wherein the primary interface and the secondary interface operate as a single PCI—PCI bridge, wherein the single PCI—PCI bridge comprises a split bridge, and wherein the primary interface and the secondary interface collectively implement a PCI—PCI bridge register set;
wherein a first peripheral device is operable to be coupled to the second PCI bus of the remote device and is operable to interoperate with the computer system without requiring rebooting of the computer system.

66. The system of claim 65,
wherein a first peripheral device coupled to the second PCI bus of the remote device is operable to be replaced with a second peripheral device coupled to the second PCI bus of the remote device, and wherein the second peripheral device is operable to interoperate with the computer system, without requiring rebooting of the computer system.

67. The system of claim 66, wherein the second device is the same type as the first device.

68. The system of claim 65,
wherein the primary interface operates as a first portion of a PCI—PCI bridge, and wherein the secondary interface operates as a second portion of the PCI—PCI bridge.

* * * * *